United States Patent Office 2,710,284
Patented June 7, 1955

2,710,284

FLUORESCENT CHEMICAL SCINTILLATORS

Mark Hyman, Jr., Belmont, Mass.

No Drawing. Application July 2, 1954,
Serial No. 441,158

10 Claims. (Cl. 252—301.2)

The present invention relates to chemical scintillators and scintillating material for detecting and measuring radiant energy rays or high energy particles such as atomic energy rays by giving off fluorescent light upon stimulation by said radiant energy rays or high energy particles. More specifically, the present invention relates to solid plastic chemical scintillators and scintillating material.

There are three known types of chemical scintillators which utilize fluorescent material or fluors to detect and measure radiant energy rays or high energy particles.

The first of these comprises large single crystals of a fluorescent compound such as anthracene or stilbene. These crystal scintillators having a satisfactory pulse height (the amount of fluorescent light given off by the impact of each high energy particle, such as an alpha or gamma ray, on the scintillator) but a slow decay time (the time it takes for fluorescent light emitted by the scintillator upon impact by a high energy particle to decay after being impacted by said particle). Furthermore, for certain usages of scintillators a relatively large mass of scintillator is required. It is impossible to produce single crystals of these compounds which are sufficiently large for some of these uses. Furthermore, it is very difficult to produce single crystals large enough for many other uses. Also, the production of these crystal scintillators is expensive and they are fragile.

The second comprises a liquid chemical scintillator comprising an organic solvent having dissolved therein a fluorescent material, as for example, alpha naphthyl phenyl oxazole. Although liquid scintillators give excellent decay times and fairly good pulse heights and can be produced in the form of a large mass, they are difficult to handle due to the fact that they are liquid and must be used with glass containers which renders them subject to leaks, easily broken and not readily portable.

The third type of scintillator and the type to which the present invention relates is a solid plastic scintillator having dissolved therein in solid solution a fluorescent material. Such scintillators are rugged and do not break easily, are inexpensive to manufacture, are portable and are easy to handle. The best hitherto known type of solid plastic scintillator comprises a polymer or copolymer of a vinyl lower alkyl (1 to 5 carbon atoms) substituted or non-substituted aromatic having dissolved in solid solution therein tetraphenyl butadiene as a scintillating agent either alone or with p-terphenyl. However, such plastic scintillators have a decay time which is slower than the better liquid scintillators and a pulse height which is somewhat lower than the better liquid scintillators. This smaller pulse height and slower decay time of known solid plastic scintillators constitutes a disadvantage of the same over liquid scintillators. However, as set forth above, liquid scintillators have certain other disadvantages due to their physical nature.

It has been discovered that a solid plastic scintillator having a diphenyl stilbene, particularly p,p'-diphenyl stilbene, dissolved in solid solution therein has a pulse height approximately 5% greater than that of the best solid plastic scintillator known heretofore and a decay time approximately 80% faster than that of the decay time of the best solid plastic scintillator known heretofore. This discovery is indeed surprising in view of the fact that a solid plastic scintillator having stilbene, which is a standard material for the manufacture of scintillator crystals, dissolved therein has a pulse height and decay time which is unsatisfactory. Furthermore, it is extremely important since a solid plastic scintillator having even a slightly increased pulse height and decay time over known plastic scintillators constitutes a marked advance in the scintillating art.

A plastic scintillator in accordance with the present invention was made as follows:

*Example 1*

Into a vertically held Pyrex tube 30 mm. O. D. x 10" long, closed at the bottom end and having a 10 mm. O. D. glass tube fused to the open top end, was placed 0.025 gram of p,p'-diphenyl stilbene, 3 grams of p-terphenyl and 100 cc. of twice vacuum-distilled vinyl toluene monomer. A method for synthesizing p,p'-diphenyl stilbene is described by Kuhn and Wagner-Juaregg, Berichte 63B (1930), 2662–2679. The twice vacuum-distilled vinyl toluene was produced by distilling 200 cc. of commercial vinyl toluene (sold by Dow Chemical Co. as a commercial vinyl toluene) at a temperature of 43° C. and a pressure of 7 mm. Hg. The first 15 cc. and the last 15 cc. of distillant was discarded and the middle 170 cc. of the distillate was collected. The collected 170 cc. of distillate was again vacuum distilled at a temperature of 43° C. and a pressure of 7 mm. Hg. The first 15 cc. and the last 15 cc. of the distillate of the second distillation step was discarded and the middle 140 cc. of distillate was recovered as the above mentioned twice vacuum distilled vinyl toluene to 100 cc. of which the p,p'-diphenyl stilbene and p-terphenyl were added. The vinyl toluene, p,p'-diphenyl stilbene and p-terphenyl were cooled in the Pyrex tube to 0° C. and while maintained at that temperature the Pyrex tube was evacuated to 1 mm. Hg pressure by means of a vacuum pump connected to the end of the 10 mm. O. D. tube attached to the end of the Pyrex tube, gas bubbles being dislodged by occasional tapping. After being opened to the 1 mm. Hg vacuum for one hour the open end of the Pyrex tube was sealed off with a hot flame. It was then placed in an oven at 110° C. After it was hot it was shaken to aid in dissolving the p,p'-diphenyl stilbene and p-terphenyl in the liquid vinyl toluene. At the end of one hour and two hours in the oven it was again shaken until all the solid material was dissolved. After the solid material was dissolved the tube was left in the oven at 110° C. for 24 hours. At the end of 24 hours the material in the Pyrex tube had polymerized to a solid. The oven with the Pyrex tube still therein was then raised to 130° C. and the tube was left therein at that temperature for another 24 hours, after which the oven was raised to 140° C., and the tube left therein at that temperature for another 48 hours. The oven with the tube therein was then cooled gradually over a six hour period to a temperature of 75° C. which is the approximate annealing temperature of solid polymers of vinyl toluene, and then maintained at 75° C. for 14 hours, in order to anneal the polymer. Thereafter the sealed top of the Pyrex tube was broken off and it was submerged in a water bath at 75° C. The water of the bath and the contents of the tube submerged therein were then permitted to stand at room temperature unil such water and contents were cooled to room temperature. The glass tube was then broken and the solid resin cylinder removed. The scintillation properties of this material were then compared with the best known plastic scintillator comprising solid vinyl toluene resin containing tetraphenyl butadiene and p-terphenyl dissolved therein. The plastic scintillator of the present invention has a pulse height approximately 5% greater and a decay time approximately 80% greater than that of the tetraphenyl butadiene scintillator.

*Example 2*

A plastic scintillator was made up in the identical manner as the scintillator of Example 1, except that p-terphenyl was omitted. The resulting plastic scintillator had a pulse height and decay time comparable to the scintillator of Example 1.

Although unsubstituted p,p'-diphenyl stilbene having the formula

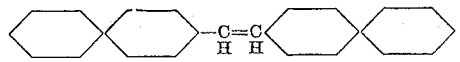

is preferred for use in the present invention, any unsubstituted or substituted, particularly lower alkyl (1 to 5 carbons) substituted, diphenyl stilbene, such as lower alkyl substituted (1 to 5 carbons) p,p'-diphenyl stilbene, can be utilized so long as it is appreciably soluble in the resin phase of the scintillator.

The resin phase of the scintillator may be comprised of any solid polymeric resin ordinarily used in solid plastic scintillators but preferably comprises a homopolymer or copolymer of one or more unsubstituted vinyl aromatic compounds and/or substituted vinyl aromatic compounds, particularly substituted vinyl aromatic compounds in which the hydrogen atom attached to the α carbon of the vinyl group and/or the hydrogen atom attached to one or more carbon atoms forming a ring of the aromatic group is substituted by a hydrocarbon group, such as a lower alkyl group having from 1 to 5 carbons, an aromatic group, a partially hydrogen saturated aromatic group and/or an alicyclic group. The term vinyl aromatic compounds as used herein includes partially hydrogenated multicyclic aromatic compounds having at least one nonhydrogenated aromatic ring to which is attached a vinyl group, as for example, vinyl tetrahydro naphthalene and vinyl 1,2-dihydro naphthalene. Examples of particular materials of which the resin phase may be composed are a solid homopolymer or copolymer of vinyl naphthalene, vinyl tetralin, p-phenyl styrene, p-cyclohexyl styrene, vinyl toluene, styrene and other like compounds. Polymers of vinyl toluene and styrene are most suitable. Polymers of vinyl toluene are preferred over polymers of styrene.

The term "polymer," as used herein, includes and is generic to both homopolymers and copolymers. The term "polymeric resin," as used herein, includes both "homopolymeric resins" and "copolymeric resins."

Preferably the diphenyl stilbene and p-terphenyl are added to the vinyl aromatic monomers but they may be added to a liquid partial polymer or copolymer of one or more vinyl aromatic monomers.

Although it is preferred that p-terphenyl be present it is not essential and p,p'-diphenyl stilbene can be used alone.

The proportions of p,p'-diphenyl stilbene are not critical. Very minute quantities of the same will give an improved scintillating effect. The maximum amount of p,p'-diphenyl stilbene which can be used is dictated only by the amount which can be dissolved in the liquid monomers or partial polymers or copolymers. The preferable proportions of p,p'-diphenyl stilbene range from about 0.01% by weight of total solid scintillator to the maximum amount which will dissolve in the liquid vinyl aromatic monomers or partial polymers or copolymers. A more suitable range of p,p'-diphenyl stilbene comprises from about .02% to about .2% by weight of the solid scintillator. The optimum amount of p,p'-diphenyl stilbene comprises about 0.1% by weight of the solid scintillator.

Although p-terphenyl is not required, when it is used it may be used in proportions limited only by the solubility of the p-terphenyl in the vinyl aromatic monomers or partial polymers or copolymers. Preferably, when used, it is present in proportions ranging from about 1% to about 5% by weight of the solid scintillator. A more suitable proportion of p-terphenyl may range from about 3% to about 5% by weight of the solid scintillator.

The vinyl toluene monomer having the p,p'-diphenyl stilbene and p-terphenyl mixed therewith is cooled to 0° C. and subjected to a vacuum in order to expel as much gas as possible therefrom. It is apparent that any known manner of driving out residual gases from the liquid monomer with the p,p'-diphenyl stilbene and p-terphenyl admixed therewith can be used.

The monomer is polymerized slowly by the use of initially low temperatures and increasing temperature stages of relatively long duration are used to prevent overheating due to the exothermic heat of polymerization, to favor the formation of long chain polymers and to avoid substantial amounts of residual monomers in the final scintillator. Overheating is liable to cause the monomer to bubble. Short chain polymers and residual monomers harmfully effect the final scintillator.

It is understood that the number of heating stages and the particular time and temperature of each stage can be varied as desired so long as the monomer is polymerized slowly and long enough to avoid bubbles, short chain polymers and large amounts of residual monomer in the final product.

Any known polymerization conditions, catalysts, promotors or activators can be used in the polymerization step so long as they do not harmfully effect the scintillating properties of the final product, and so long as they do not cause bubbling, do not favor the formation of short chain polymers and do not result in a large amount of residual monomer.

It is important that before any large amount of polymerization occurs the p,p'-diphenyl stilbene and p-terphenyl be substantially completely dissolved in the vinyl toluene monomer.

The solid polymer is cooled slowly (ordinarily over a period of 6 hours or more) to annealing temperatures in order to prevent undue strains from being set up in the resin due to shrinkage on cooling, which might cause crazing of the solid resin and the formation of bubbles therein. The resin is annealed at such annealing temperatures from about 12 to 24 hours in order to relieve any strains which might be set up in the resin during cooling.

The annealing temperatures of the various resins are readily available from the literature. Although the resin is cooled over a period of 6 hours in the examples and is annealed over a period of 14 hours, this cooling time and annealing time is not critical so long as they are of sufficient length to avoid undue strains in the final resin.

The annealed resin is placed in a water bath after the sealed top of the Pyrex tube is broken off to cause the resin to separate from the inner glass surfaces of the Pyrex tube. This is brought about by the water working its way between the resin and glass surfaces.

It is not intended that the present invention shall be limited to any theory set forth herein, but shall be limited only by the scope of the claims set forth hereafter and the equivalents thereof.

I claim:

1. A solid plastic scintillator containing in solid solution in a polymeric resin one of the group consisting of an unsubstituted and a lower alkyl substituted diphenyl stilbene.

2. The scintillator of claim 1 wherein said one of said group comprises an unsubstituted diphenyl stilbene.

3. The scintillator of claim 2 wherein said unsubstituted diphenyl stilbene comprises p,p'-diphenyl stilbene.

4. The scintillator of claim 3 containing p-terphenyl.

5. The scintillator of claim 1 wherein said one of said group comprises a lower alkyl substituted diphenyl stilbene.

6. The scintillator of claim 1 wherein said resin comprises one of the group consisting of a solid homopolymer of an unsubstituted vinyl aromatic compound, a solid homopolymer of a hydrocarbon substituted vinyl aromatic compound, a solid copolymer of different unsubstituted vinyl aromatic compounds, a solid copolymer of different hydrocarbon substituted vinyl aromatic compounds and a solid copolymer of an unsubstituted vinyl aromatic compound and a hydrocarbon substituted vinyl aromatic compound.

7. The scintillator of claim 6 wherein said resin comprises a solid homopolymer of vinyl toluene and wherein said one of said group comprises p,p'-diphenyl stilbene.

8. The scintillator of claim 7 containing in solid solution p-terphenyl.

9. The scintillator of claim 6 wherein said resin comprises a solid homopolymer of styrene and wherein said one of said group comprises p,p'-diphenyl stilbene.

10. The scintillator of claim 9 containing in solid solution p-terphenyl.

References Cited in the file of this patent

Curran: Luminescence and the Scintillation Counter, 1953, pp. 126, 127; publisher—Academic Press, Inc.

Buck; Article in Nucleonics, vol. 11, No. 11, November 1953, pp. 48–52.